(12) United States Patent
Holland (10) Patent No.: US 11,125,533 B1
(45) Date of Patent: *Sep. 21, 2021

(54) QUICK AIM RETICLE

(71) Applicant: Darrell Holland, Powers, OR (US)

(72) Inventor: Darrell Holland, Powers, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,335

(22) Filed: Apr. 8, 2020

(51) Int. Cl.
*F41G 1/38* (2006.01)
*G02B 27/32* (2006.01)
*G02B 25/00* (2006.01)

(52) U.S. Cl.
CPC ............. *F41G 1/38* (2013.01); *G02B 25/001* (2013.01); *G02B 27/32* (2013.01)

(58) Field of Classification Search
CPC ... F41G 1/38; F41G 1/473; F41G 3/06; G02B 23/14; G02B 27/32
USPC .................. 42/122, 13; 89/41.17; 356/21
See application file for complete search history.

(56) References Cited

U.S. PATENT DOCUMENTS

| | | |
|---|---|---|
| 1,190,121 A | 7/1916 | Critchett |
| 3,190,003 A | 6/1965 | O'Brien |
| 3,392,450 A | 7/1968 | Herter et al. |
| 3,744,133 A | 7/1973 | Fukushima et al. |
| 3,782,822 A | 1/1974 | Spence et al. |
| 3,826,012 A | 7/1974 | Pachmayr |
| 3,862,012 A | 1/1975 | Stork |
| 3,948,587 A | 4/1976 | Rubbert |
| 3,990,155 A | 11/1976 | Akin et al. |
| 4,263,719 A | 4/1981 | Murdoch |
| 4,389,791 A | 6/1983 | Ackerman |
| 4,531,052 A * | 7/1985 | Moore ...................... F41G 3/06 235/404 |
| 5,491,546 A | 2/1996 | Wascher |
| 5,499,455 A | 3/1996 | Palmer |
| 5,920,995 A | 7/1999 | Sammut |
| 5,960,576 A | 10/1999 | Robinson |
| 6,357,158 B1 | 3/2002 | Smith |
| 6,453,595 B1 | 9/2002 | Sammut |
| 6,516,551 B2 | 2/2003 | Gaber |
| 6,516,699 B2 | 2/2003 | Sammut et al. |
| 6,591,537 B2 | 7/2003 | Smith |
| 6,609,325 B2 | 8/2003 | Harris |
| 6,681,512 B2 | 1/2004 | Sammut |
| 6,729,062 B2 | 5/2004 | Thomas |
| 6,772,550 B1 | 8/2004 | Leatherwood |
| 7,738,082 B1 * | 6/2010 | Peters ...................... F41G 3/02 356/4.01 |
| 7,856,750 B2 | 12/2010 | Sammut et al. |
| 8,109,029 B1 | 2/2012 | Sammut et al. |

(Continued)

*Primary Examiner* — Bret Hayes (74) *Attorney, Agent, or Firm* — Timothy E. Siegel Patent Law, PLLC; Timothy E. Siegel (57) ABSTRACT

A rifle scope has an eyepiece and a reticle, and wherein the reticle when viewed through the eyepiece displays a horizontal center line that is at the vertical center of the display, and wherein below the horizontal center line there is a set aiming lines, each marked by a first indicium on a first horizontal side of the aiming line, indicating an angle measured in minutes of angle, from the horizontal center line. Finally, a subset of the aiming lines is marked with a second indicium, on a second horizontal side, opposed to the first horizontal side, of the aiming line, and wherein each the second indicium indicates distance in inches from the brisket to the top of the shoulders of a type of deer.

15 Claims, 9 Drawing Sheets

(56) References Cited

U.S. PATENT DOCUMENTS

| | | |
|---|---|---|
| 8,966,806 B2 | 3/2015 | Sammut et al. |
| 9,121,672 B2 * | 9/2015 | Tubb ................... F41G 1/473 |
| 9,335,123 B2 | 5/2016 | Sammut |
| 10,302,395 B1 | 5/2019 | Holland |
| 2003/0145505 A1 | 8/2003 | Kenton |
| 2005/0229468 A1 | 10/2005 | Zederey |

* cited by examiner

QUICK AIM RETICLE

BACKGROUND

Hunting for deer requires quick decision making. Time required to make calculations can be time that a deer uses to move on to more inviting forage, leaving the hunter's field of view. Accordingly, a system that can be used in a brief moment and without needing to take one's eye from a scope eyepiece, is advantageous.

Also, increasingly common timed shooting competitions require participants to navigate a course, while shooting at targets, some of which are deer shaped. If a participant uses a laser range finder, the time to read the laser range finder and adjust the elevation knob accordingly is time lost in negotiating the course. A faster way of ranging and aiming would provide a competitor with an advantage, in finishing the course quickly.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first, separate aspect, the present invention may take the form of a rifle and rifle scope assembly, including a rifle and a rifle scope housing, attached to the rifle, the housing defining an eyepiece. An optical train is mounted in the housing and includes a reticle lens. When a user looks through the eyepiece, the reticle lens presents a display, that has a horizontal center line at the vertical center of the display. Below the horizontal center line there is a set aiming lines, each marked by a first indicium on a first horizontal side of the aiming line, indicating the angle at which the rifle will be pointed up, relative to a zeroed angle, if the horizontal line is placed coincident to a target that is at horizontal, at the range for which the rifle has been zeroed. Also, a subset of the aiming lines is marked with a second indicium, on a second horizontal side, opposed to the first horizontal side, of the aiming line, and wherein the second indicium indicates a characteristic of a particular type of target. Also, for a first one of the aiming lines the second indicium indicates a characteristic of a black tail deer, and wherein if a shooter aligns the first one of the aiming lines with the brisket of a black tail deer, and then finds a second aiming line, which aligns to the top of the shoulder of the black tail deer, then the second aiming line if aligned to the center of the kill zone of the black tail deer, will provide a shot aimed at the kill zone.

In a second, separate aspect, the present invention may take the form of a method of aiming at an adult land-based ungulate target of a recognizable first type, that utilizes a rifle and rifle scope assembly, including a rifle and a rifle scope housing, attached to the rifle, the housing defining an eyepiece. An optical train is mounted in the housing and includes a reticle lens. When a user looks through the eyepiece, the reticle lens presents a display having a horizontal center line at the vertical center of the display. Below the horizontal center line there is a set aiming lines, each marked by a first indicium on a first horizontal side of the aiming line, indicating the angle at which the rifle will be pointed up, relative to a zeroed angle, if the horizontal line is placed coincident to a target that is at horizontal, at the range for which the rifle has been zeroed. Also, a subset of the aiming lines is marked with a second indicium, on a second horizontal side, opposed to the first horizontal side, of the aiming line, and wherein the second indicium indicates a characteristic of a particular type of target.

In the method, the aiming line having the second indicium indicating a characteristic of the first type of land-based ungulate is aligned to the bottom of the brisket of the target and an aiming line closest to the top of the shoulders of the target is found and then re-aligned so that it overlays the kill zone of the target.

In a third, separate aspect, the present invention may take the form of a rifle scope having an eyepiece and a reticle, and wherein the reticle when viewed through the eyepiece displays a horizontal center line that is at the vertical center of the display. Below the horizontal center line there is a set aiming lines, each marked by a first indicium on a first horizontal side of the aiming line, indicating an angle measured in minutes of angle, from the horizontal center line. Finally, a subset of the aiming lines are marked with a second indicium, on a second horizontal side, opposed to the first horizontal side, of the aiming line, and wherein each the second indicium indicates distance in inches from the brisket to the top of the shoulders of a type of deer.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENTS

Figure 1:
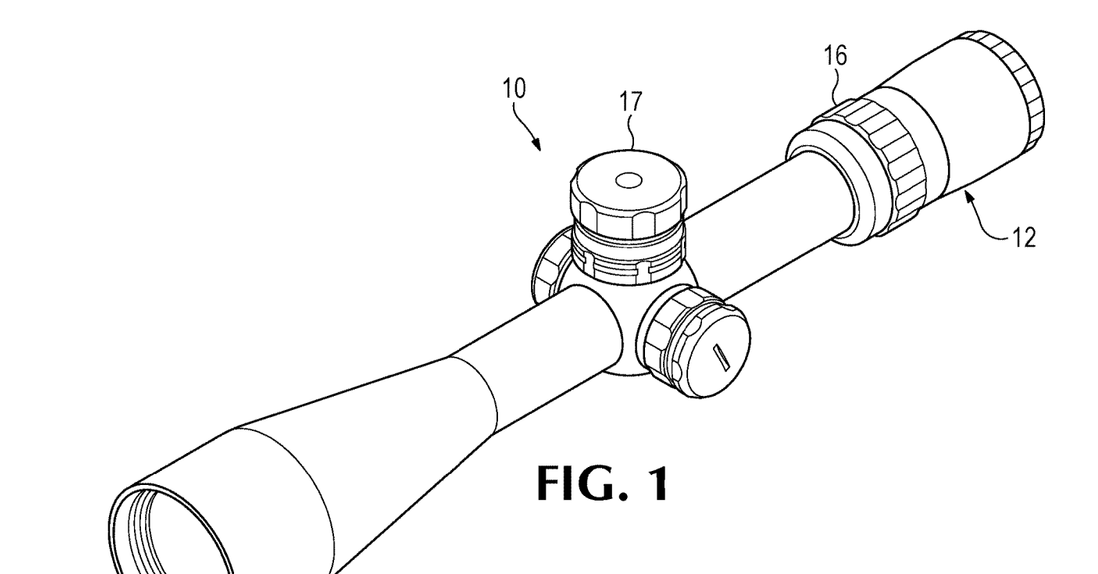
FIG. 1 is an isometric view of a rifle scope according to the present invention.
Figure 2:
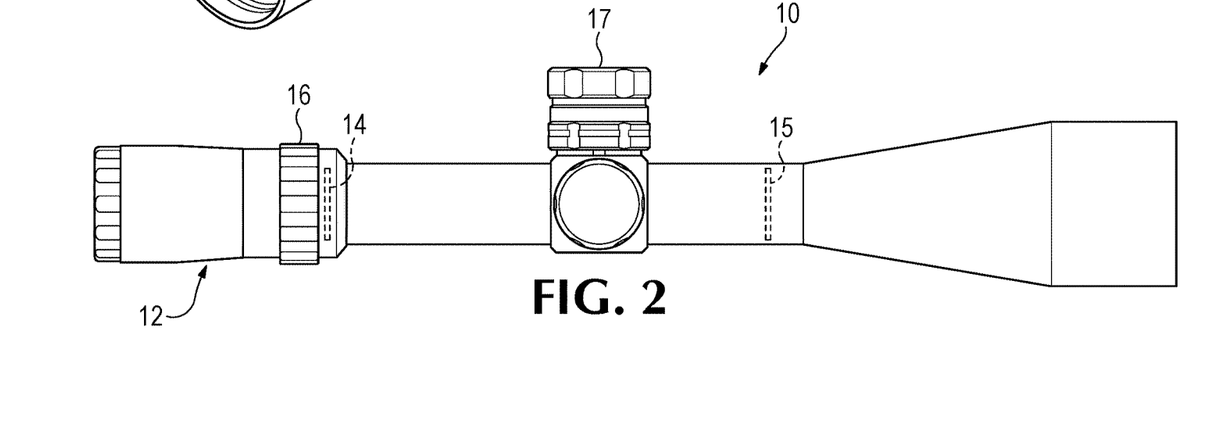
FIG. 2 is a side view of the rifle scope of FIG. 1.

Referring to FIGS. 1 and 2, a rifle scope 10, according to a preferred embodiment of the present invention, includes an eyepiece 12, a reticle lens 14, positioned in the second focal plane, and a zoom selector or power ring 16. In embodiments, scope 10 is attached to a rifle by a well-known method, such as by way of a Picatinny rail, to form a scope and rifle assembly (not shown). In an alternative embodiment the reticle lens is positioned in the first focal plane 15. An elevation knob 17 permits adjustment of the elevation of the reticle marks as seen by a user, versus the actual pointing direction of the scope 10 (and thereby the attached rifle). All of the assertions made in this application presume a properly aligned and formed rifle and scope assembly, with use of a standard cartridge and aiming at a standard kill zone, as defined below.

Figure 3:
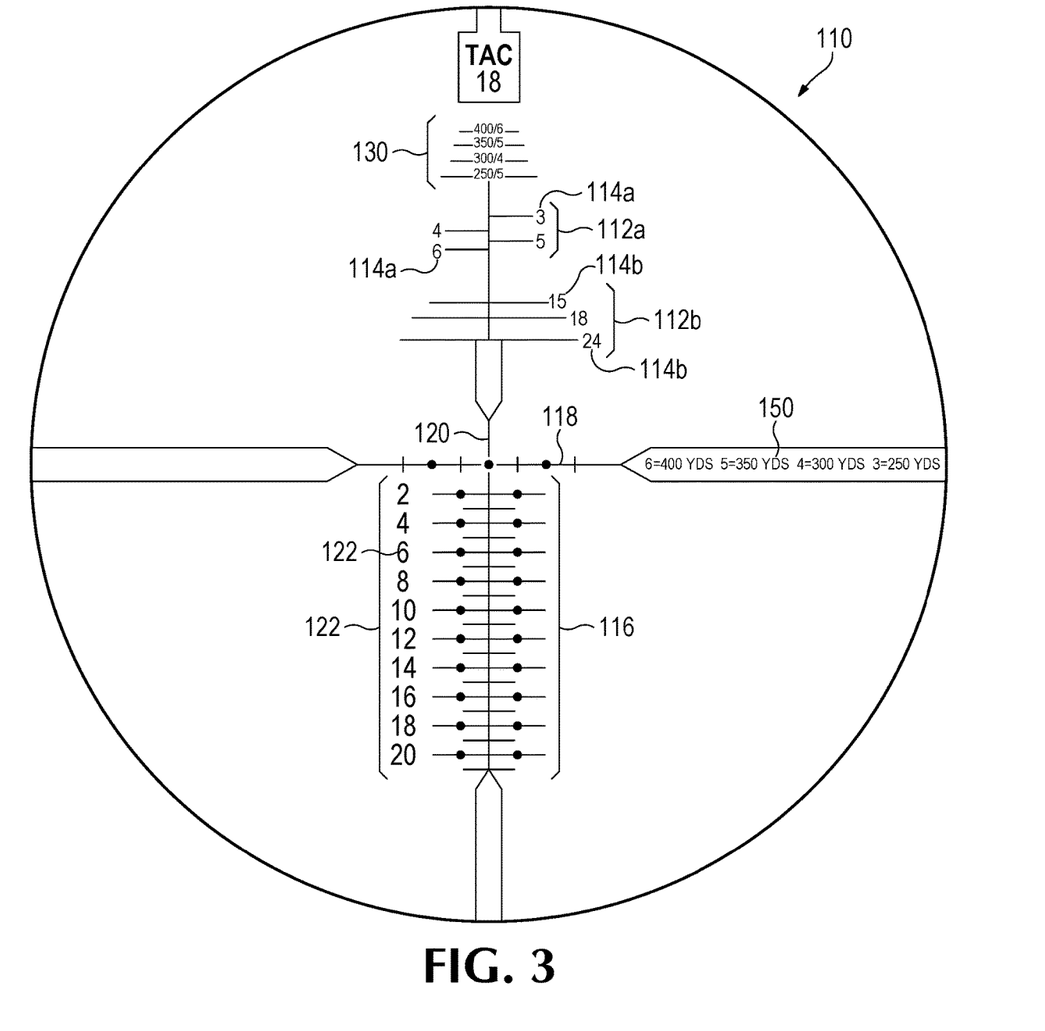
FIG. 3 is a reticle as seen through the scope of FIG. 1.

Referring to FIG. 3, a hunter viewing through the rifle scope 10 (attached to a rifle to form an assembly of rifle and scope) sees the reticle design 110 shown. For the embodiment in which the reticle lens is positioned in the second focal plane, the markings shown correspond to the highest level of scope magnification. The hunter may line up a target of known height, so that it is between, or subtends, a pair of lines, with a first line of the pair selected from a set of first lines 112a, and the second line of the pair selected from a set of second lines 112b, with both sets situated in the upper portion of the field of view. The set of first lines 112a are each marked with an indicium 114a, and the set of second lines 112b are each marked with an indicium 114b.

Figure 4A:
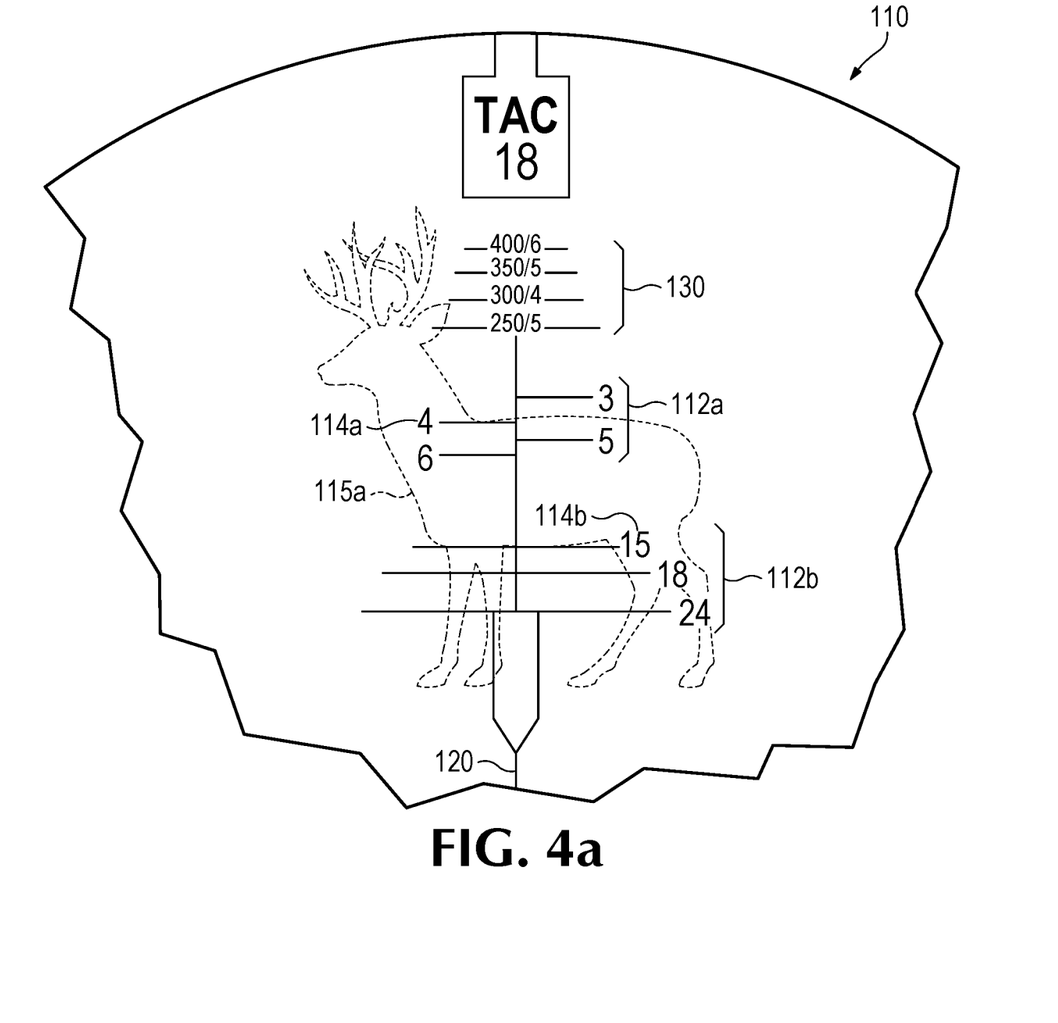
FIG. 4a is a view of a black tail buck at 300 yards, on the reticle of FIG. 3.
Figure 4B:
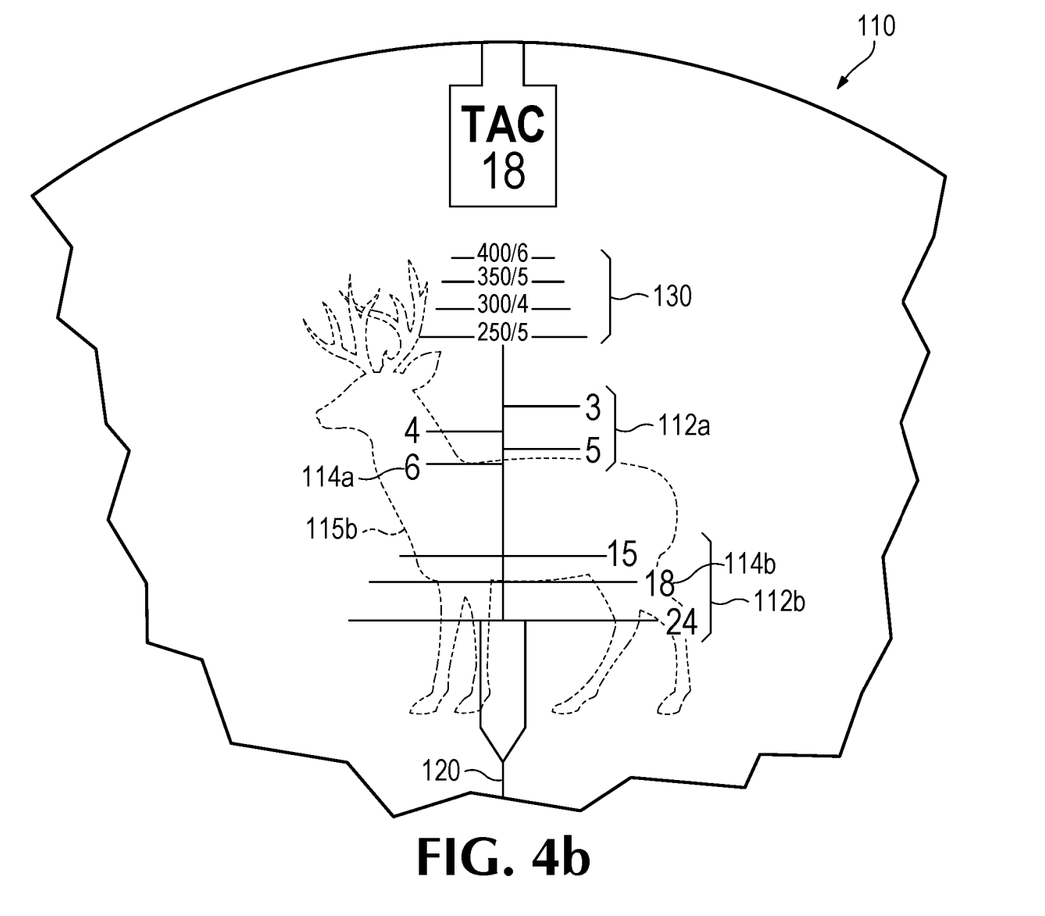
FIG. 4b is a view of a mule deer buck at 400 yards, on the reticle of FIG. 3.

In use of the scope 10 having reticle design 110, a shooter chooses a line from the set of second lines 112b based on pre-knowledge of the vertical height of the target. For example, it is well known that an adult Black Tail Deer measures 15" from back to brisket (the bottom of the rib cage), as does an Antelope, a Coues Deer and a Texas White Tail Deer. Accordingly, if the shooter were taking aim at one of those creatures, he would choose the second line 112b that is marked with a "15" indicium 114b. Then, he determines which one of the first lines 112a forms a pair with the selected second line 112b that brackets the buck from back to brisket (the bottom of the rib cage). FIG. 4a shows a Black Tail Buck 115a at 300 yards, subtending the pair of lines formed by the line 112b marked with a "15" indicium 114b and the line 112a marked with the "4" indicium 114a, indicating that 4 minutes of angle ("moa") are required to compensate for bullet drop to the target, which is at about 300 yards. In FIG. 4b, a Mule Deer Buck 115b is shown subtending the pair of lines formed by the line 112b marked with an "18" indicium 114b and the line 112a marked with a "6" indicium 114a. The indicia 114a and 114b, each reflect a target measurement made from the top of a second line 112b to the bottom of a first line 112a, as opposed to a measurement from the center of a second line 112b to a center of a first line 112a. With this innovation none of the target is blocked by either line 112a or 112b, both of which have some finite width, which would otherwise introduce uncertainty to the process of fitting a target to a pair of lines.

Notably, the reticle design shown also permits aiming at a mule deer, using a line selected from the second set of lines 112b, and marked at "18" by the indicium 114b, reflecting the 18" distance from the back of a mule deer to the bottom of the brisket. Similarly, the second lines also permit ranging a cow elk, by using the line marked with indicium 114b as "24," reflecting the distance in inches from the back to the brisket of an adult cow elk.

Figure 4C:
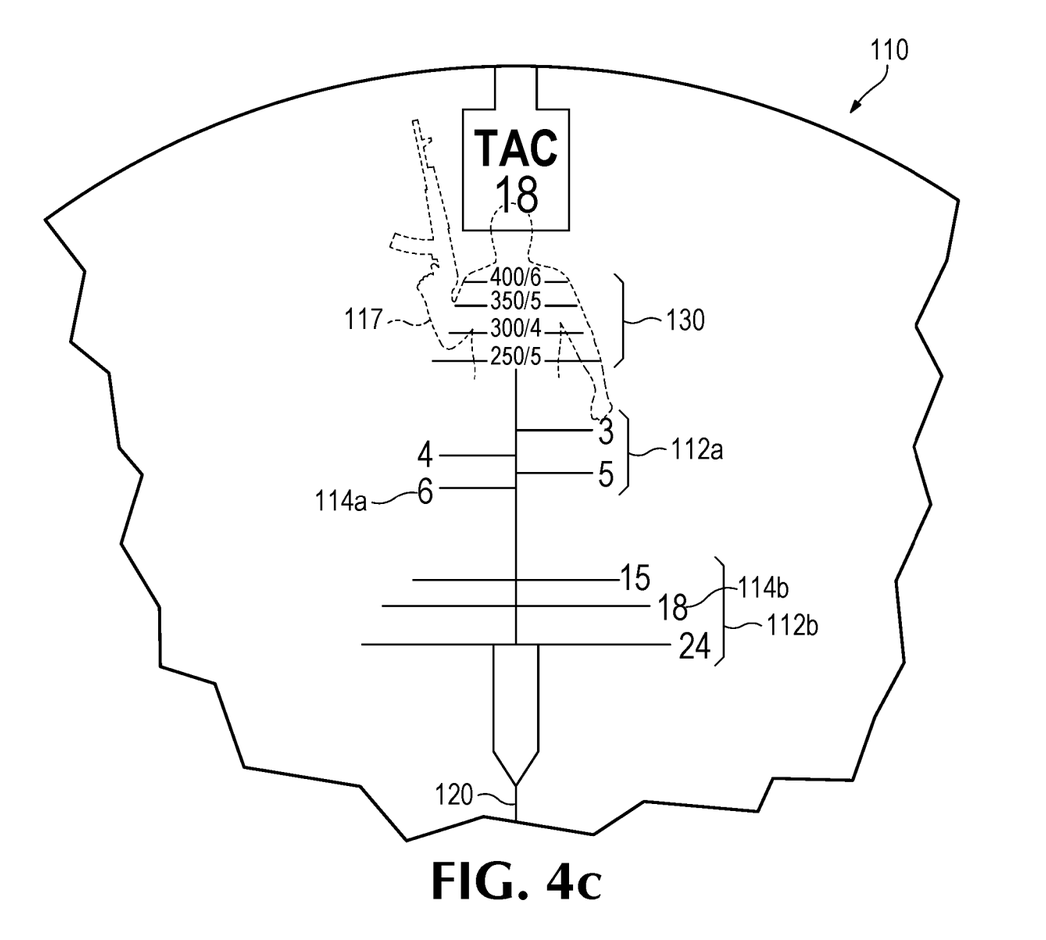
FIG. 4c is a view of a human figure at 400 yards.

A set of third lines 130, are provided for quickly measuring the range to a target that is 18" in width, such as a man shaped target that may be present in a shooting competition. This is indicated by the "TAC 18" icon at the very top of the reticle pattern. Third lines 130 are each marked by the range in yards to an 18" width target that fits the line width, and the moa of bullet drop that will occur over that range, in a format of "range/bullet drop". To use lines 130 a shooter determines which line best fits the 18" width target and reads the bullet drop indicium in the middle of the line 130 that best fits the shoulder width. FIG. 4c shows lines 130 being used to range a man 117, or a man-shaped target, as is often used in shooting contests. A man is typically 18 inches across at the back, with the top line of lines 130 indicating that the figure is at 400 yards.

Figure 4D:
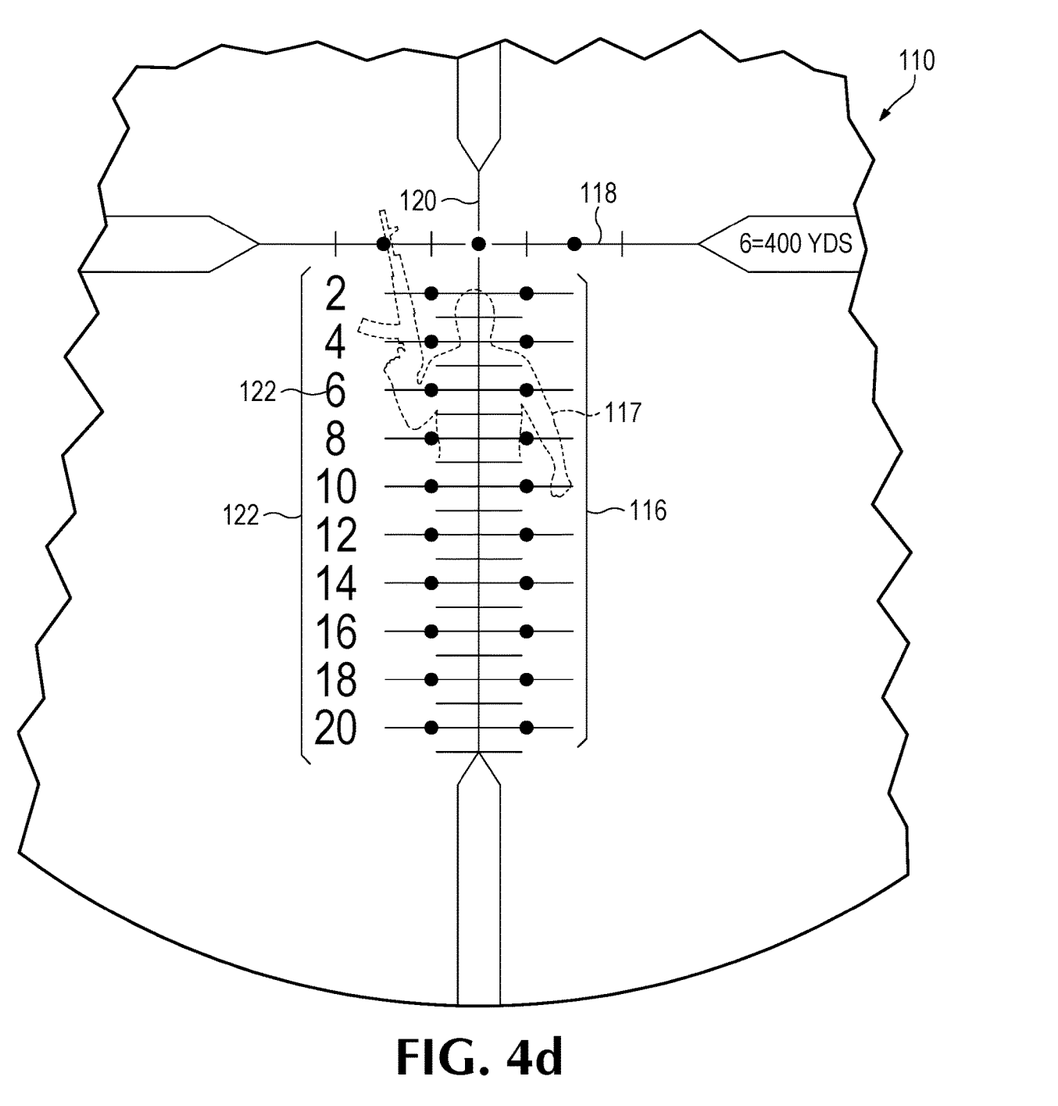
FIG. 4d is a view of the reticle aimed at the human figure as informed by the ranging of FIG. 4c.

Referring to FIG. 3 and FIG. 4d, a set of marks 116, below the horizontal line 118, in the embodiment shown taking the form of a set of lines, crossing a vertical line 120, but which could also be some other shape, and marked with indicia 122, that match indicia 114a. So, in the Black Tail Buck example presented above, the shooter places the mark 116 bearing the indicium "4" on the target, thereby lifting a rifle attached to the scope up by 4 moa, enough to compensate for the bullet drop to the target. In the Mule Deer example, the hunter would place the mark 116 bearing the "6" on the target. FIG. 4d shows the reticle being used to aim at the human FIG. 117, with the center of the line 116 that is marked with a "6" by an indicium 122, placed over the heart location of the FIG. 117, as was indicated by the ranging performed in FIG. 4c.

Figure 5:
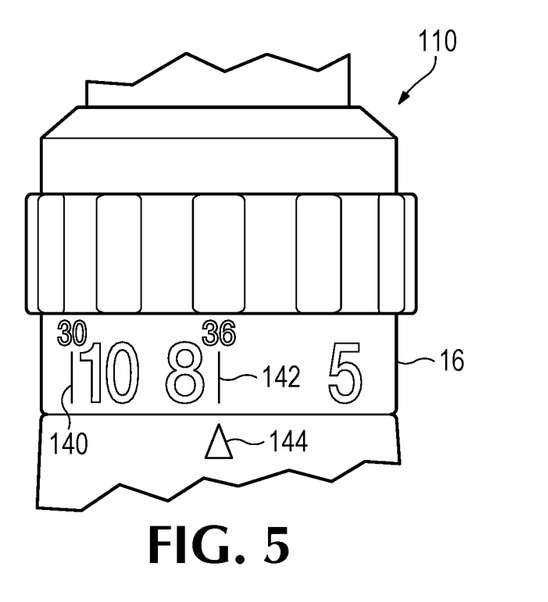
FIG. 5 is an isometric view of the zoom ring of the scope of FIG. 1.

Referring to FIG. 5, zoom selector ring 16 is marked with two marks 140 and 142, as shown "30" and "36," respectively. When the numeral 30 is chosen (the zoom selector ring 16 is moved so that the number is aligned with alignment mark 144, a providing a lower level of magnification), and thereby calibrating the line "24" (FIGS. 3, 4a, 4b, 4c) as a "30" or "36" inch target size indicating line. Then the line 112b marked with a "24" can be used to range a larger target, that is 30" high. But if the numeral "36" is chosen, then the line 112b marked with a "24" can be used to range targets that are 36" vertically, for example a bull elk, in the same way that the same line can be used to range a cow elk when the zoom selector ring 16 is turned to "24". In the instance of using these lower magnification levels, the indicia of the marks 116 do not reflect the moa necessary to correct for bullet drop. Some hunters may be knowledgeable enough to correct for the lower magnification level in the use of marks 116. Alternatively, a hunter may turn the zoom selector ring 16 to the highest level of magnification, and then use marks 116, which will accurately compensate for the bullet drop determined in the previous step, or he can use the elevation knob 17 (FIGS. 1 and 2) to correct for bullet drop. If the reticle lens 14 (FIG. 2) is in the first focal plane, zoom adjustments do not affect the spacing of the reticle lines, relative to images in the field of view. The user may use marks 116 to compensate for bullet drop, or the elevation knob 17, informed by the moa markings of lines 112a.

Finally, in an additional feature, a legend 150 permits those using a laser range finder to quickly convert the range provided by the range finder to moa, which may then guide the usage of marks 116, in the pointing up of a fire arm that is attached to scope 10, to a degree that compensates for bullet drop, to the range of the target.

Generally speaking, a user may alter the position of horizontal line 118 relative to the boresight of the rifle, to compensate for the type of cartridge being used, according to well-known techniques.

Figure 6:
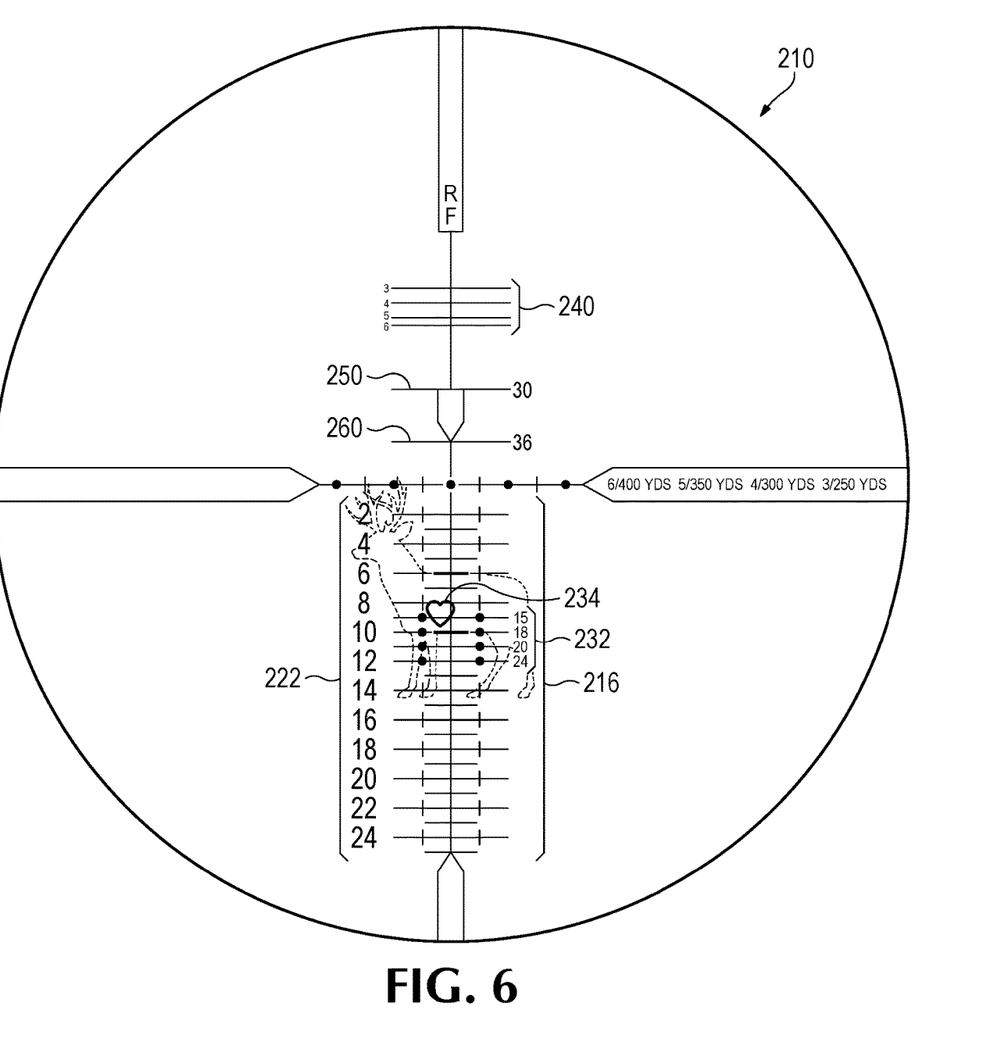
FIG. 6 is a view of an alternative reticle as seen through a scope that is outwardly the same as the scope of FIG. 1, with a buck in view.
Figure 7:
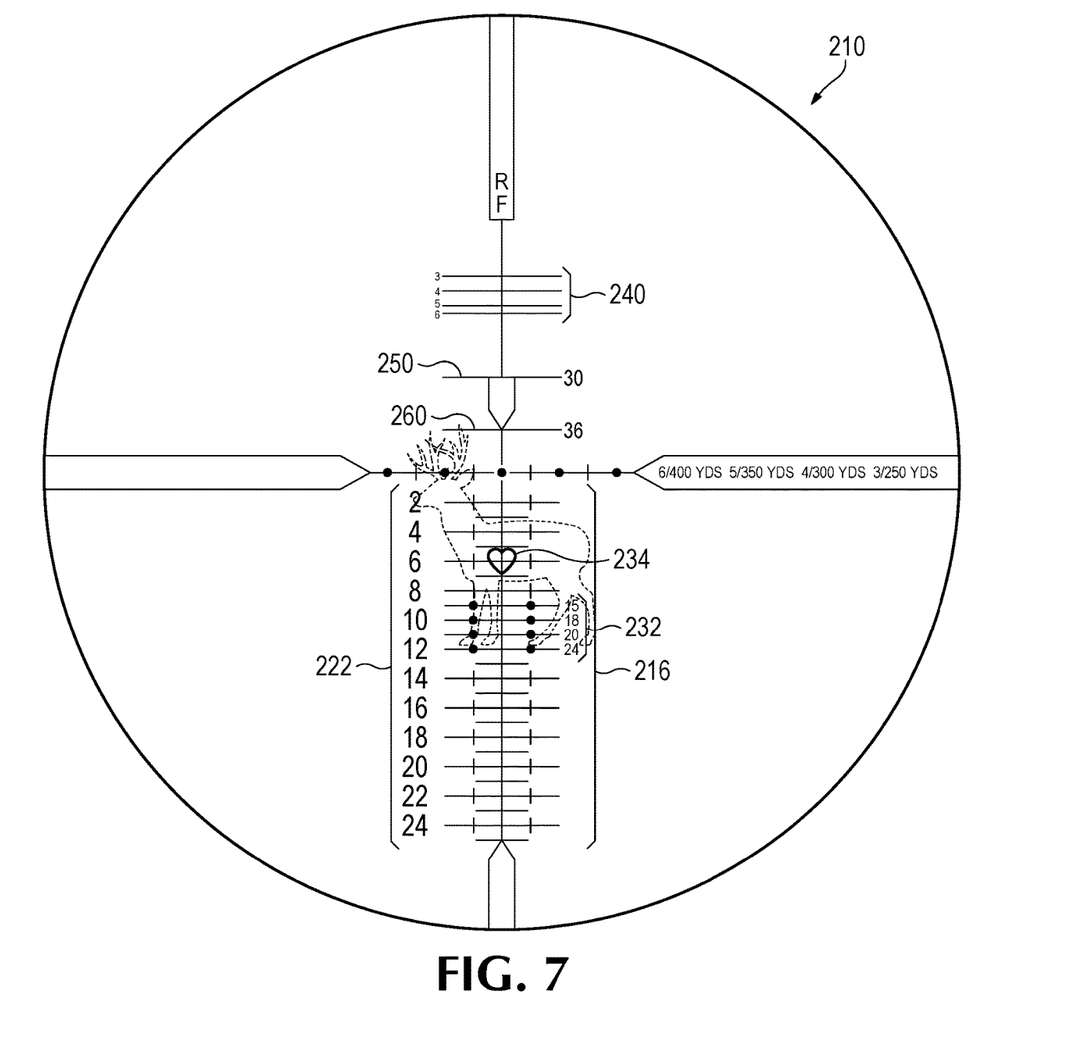
FIG. 7 is a view of the reticle of FIG. 6, aimed at the heart of the buck.

Referring now to FIG. 6, in an alternative embodiment that of a rifle scope that is outwardly the same as that of FIG. 1, a different reticle design 210 is used. In this design, marks 216 are the same as marks 116 in reticle design 110, but four of the lines 216, in addition to being labelled with a first indicia 222 (the same as indicia 122 in design 110) are labelled with a second indicia 232, on the side opposite to first indicia 222. The second indicia 232 represent the height in inches from the bottom of the brisket to the top of the shoulders for various land-based ungulates, including various species of deer. For example, the indicia "15" indicates this distance for a black tale dear, whereas the indicia "18" indicates this distance for a mule deer. In the example shown, the hunter has aligned the mark 216 labelled "18" by second indicia 232 with the brisket of a mule deer buck, the indicia 222 of the aiming mark 216 that is then aligned with the shoulders of the buck indicates an aiming mark, labelled in minute of angle, that the rifle must be pointed up, relative to zero, in order to compensate for the bullet drop to that buck. This aiming solution will deliver the bullet to a kill zone having a radius of 5 inches about a central point (henceforth a "standard kill zone"), given that the indicated aiming mark, is aligned to that central point. In the example shown this is six (6) minutes of angle. As shown in FIG. 7, the shooter may then re-align his rifle so that the aiming mark labelled with the "6" that was at the shoulders of the buck is now aimed at the center of the kill zone 234 (indicated schematically by a heart, but actually in the shape of a circle) of the buck, causing the rifle to be aimed at some point in the kill zone, given the use of a cartridge that provides a muzzle velocity of between 2500 and 3100 fps (henceforth "standard cartridge").

TABLE 1

Actual Correction Needed to Precisely Compensate for Bullet Drop

| CARTRIDGE SELECTION/ MUZZLE VELOCITY | Zero Range | 3MOA 250 yds | 4MOA 300 yds | 5MOA 350 yds | 6MOA 400 yds |
|---|---|---|---|---|---|
| 243 Win. 100 gr. 2960 fps | 100 | 2.5 | 3.75 | 5.0 | 6.5 |
| 25-06 Rem. 117 gr. 3030 fps | 100 | 2.25 | 3.50 | 4.75 | 6.0 |
| 6.5x55 140 gr. 2525 fps | 200 | 1.5 | 3.0 | 4.75 | 6.5 |
| 6.5 CRD. 140 ELD. 2750 fps. | 150 | 2.25 | 3.5 | 4.75 | 6.25 |
| 270 Win. 130 gr. 3060 fps | 100 | 2.25 | 3.25 | 4.5 | 6.0 |
| 270 WSM. 130 gr. 3225 fps | 100 | 2.0 | 2.75 | 4.0 | 5.0 |
| 7x57 139 gr. 2680 fps | 175 | 1.75 | 3.25 | 4.75 | 6.5 |
| 7-08 140 gr. 2770 fps | 150 | 2.25 | 3.5 | 5.0 | 6.5 |
| 280 Rem. 150 gr. 2890 fps | 100 | 2.5 | 3.75 | 5.0 | 6.5 |
| 7 Mag. 140 gr. 3100 fps | 100 | 2.0 | 3.0 | 4.0 | 5.25 |
| 7 Mag. 160 gr. 2950 fps | 100 | 2.25 | 3.5 | 4.5 | 5.75 |
| 308 Win. 150 gr. 2820 fps | 175 | 1.75 | 3.25 | 4.75 | 6.5 |
| 308 Win. 180 gr. 2570 fps | 200 | 1.50 | 3.0 | 5.0 | 6.75 |
| 30-06 165 gr. 2800 fps | 175 | 1.75 | 3.0 | 4.5 | 6.0 |
| 30-06 180 gr. 2700 fps | 175 | 1.75 | 3.25 | 4.5 | 6.25 |
| 300 WMag. 180 gr. 2960 fps | 100 | 2.25 | 3.5 | 4.75 | 6.0 |
| 300 Whby. 180 gr. 3125 fps | 100 | 1.50 | 3.0 | 4.25 | 5.25 |
| 338 WMag. 225 gr. 2780 fps | 150 | 2.25 | 3.5 | 5.0 | 6.5 |

Skilled persons will note that the relationship between target range and elevation angle to precisely compensate for bullet drop is not linear, so the first indicia 222 for the mark 216 that is aligned with the top of the shoulders cannot be consistently precisely accurate. Table 1 shows the effect of this error, with cartridge types, abbreviated in a manner which will be familiar with shooting sportsman, in the left hand column and range to which the rifle is zeroed (zero range), in the next column to the right. The numbers in the table cells to the right are the actual minutes of angle (MOA) that the rifle must be pointed upward to precisely compensate for bullet drop at the range listed in the column header. Above this range figure is the MOA that a shooter would use if correctly using the method described here. All of the errors (difference between actual and MOA when using this method) are less than 1.5 MOA, most much less. Importantly, what is lost in accuracy is gained in speed of rifle realignment, as the rifle need be moved only a very small amount to align the mark 216 from a position where it aligned to the top of the shoulders to the kill zone. Both in hunting and in shooting contests speed is of the essence, as a quarry may move, given even a few seconds more time, and as other contest participants will also aim quickly.

Lines 240 may be used in conjunction with line 250 or 260 to range very large land-based ungulates, such as an elk (line 250, labelled "30") or a moose (line 260, labelled "36"). The indicia to the left of lines 240 represent the moa of elevation that the rifle must be elevated to compensate for the bullet drop of an elk or a moose, whose midsection (bottom of brisket to top of shoulders) extends from line 250 or 260, respectively, to the line 240, which will vary depending on the range to the elk or moose. In one embodiment, zoom selector ring 16 is eliminated for a scope having reticle design 210, because all sizes of prey are accommodated, by design 210. The user would then use the line 222 having the moa indication that was indicated by the line 240 that aligned to the top of the shoulders of the elk or moose, as an aiming guide. Notably, because all sizes of targets are accommodated, the reticle design 210 is in one embodiment placed at the first focal plane, thereby obviating the need for the markings 140 and 142 on the zoom selector ring 16 as shown in FIG. 5.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A rifle and rifle scope assembly, comprising:
   (a) a rifle;
   (b) a rifle scope housing, attached to said rifle, said housing defining an eyepiece;
   (c) an optical train, in said housing;
   (d) a reticle lens, in said optical train; and
   (e) wherein when a user looks through said eyepiece, said reticle lens presents a display having:
      (i) a horizontal center line at the vertical center of said display, and below said horizontal center line:
      (ii) a set of aiming lines, each marked by a first indicium on a first horizontal side of said aiming line, indicating the angle at which said rifle will be pointed up, relative to a zeroed angle, if said horizontal line is placed coincident to a target that is at horizontal, at the range for which said rifle has been zeroed;
      (iii) wherein a subset of said aiming lines are marked with a second indicium, on a second horizontal side, opposed to said first horizontal side, of said aiming line, and wherein said second indicium indicates a characteristic of a particular type of target;
      (iv) wherein for a first one of said aiming lines said second indicium indicates a characteristic of a black tail deer, and wherein if a shooter aligns said first one of said aiming lines with the brisket of a black tail deer, and then finds a second aiming line, which aligns to the top of the shoulder of said black tail deer, then the second aiming line if aligned to the center of the standard kill zone of said black tail deer, if using a standard cartridge, will provide a shot aimed at said kill zone.

2. The rifle and rifle scope assembly of claim 1, wherein said second indicium, indicates height in inches of some aspect of said particular type of target.

3. The rifle and rifle scope assembly of claim 1, wherein said second indicium indicates that height in inches, from brisket to the top of the shoulders, for various adult, land-based ungulates.

4. The rifle and rifle scope assembly of claim 3, wherein one of said adult, male, land-based ungulates is a black tail buck.

5. The rifle and rifle scope assembly of claim 4, wherein said characteristic of a black tail deer is the numeral "15", which represents the distance in inches from the bottom of the brisket to the top of the shoulders, for an average adult black tail buck.

6. A method of aiming at an adult land-based ungulate target of a recognizable first type, comprising:
(a) providing a rifle and rifle scope assembly, comprising:
   (i) a rifle;
   (ii) a rifle scope housing, attached to said rifle, said housing defining an eyepiece;
   (iii) an optical train, in said housing;
   (iv) a reticle lens, in said optical train; and
   (v) wherein when a user looks through said eyepiece, said reticle lens presents a display having: a horizontal center line at the vertical center of said display, and below said horizontal center line: a set aiming lines, each marked by a first indicium on a first horizontal side of said aiming line, indicating the angle at which said rifle will be pointed up, relative to a zeroed angle, if said horizontal line is placed coincident to a target that is at horizontal, at the range for which said rifle has been zeroed; wherein a subset of said aiming lines are marked with a second indicium, on a second horizontal side, opposed to said first horizontal side, of said aiming line, and wherein said second indicium indicates a characteristic of a type of adult land-based ungulate, one of said second indicium indicating a characteristic of said recognizable first type of land-based ungulate;
(b) finding said aiming line having said second indicium indicating a characteristic of said first type of land-based ungulate and aligning said aiming line to the bottom of the brisket of said target;
(c) finding an aiming line closest to the top of the shoulders of said target;
(d) re-aligning said aiming line closest to the top of the shoulders of said target, so that it said aiming line overlays the kill zone of said target.

7. The method of claim 6, wherein said adult land-based ungulate target is an adult land-based ungulate.

8. The method of claim 7, wherein said adult land-based ungulate is a deer.

9. The method of claim 8, wherein said deer is a black tail deer.

10. The method of claim 6, wherein said adult land-based ungulate target is an outline of a side profile of an adult land-based ungulate, formed on a substrate.

11. The method of claim 6, wherein said characteristic of a type of adult land-based ungulate is the distance in inches from the brisket of an average adult of said land-based ungulate to the top of the shoulders of said average adult of said land-based ungulate.

12. The method of claim 11, one of said second indicia is the numeral "15" representing the distance in inches from the brisket to the top of the shoulders of a black tail deer.

13. A rifle scope having an eyepiece and a reticle, and wherein the reticle when viewed through said eyepiece displays:
(a) a horizontal center line at the vertical center of said display, and below said horizontal center line:
(b) a set of aiming lines, each marked by a first indicium on a first horizontal side of said aiming line, indicating an angle measured in minutes of angle, from said horizontal center line;
(c) wherein a subset of said aiming lines are marked with a second indicium, on a second horizontal side, opposed to said first horizontal side, of said aiming line, and wherein each said second indicium indicates distance in inches from the brisket to the top of the shoulders for a type of adult, male deer.

14. The rifle scope of claim 13, wherein one of said second indicia is the numeral "15" indicating the distance in inches from the bottom of the brisket to the top of the shoulders of an adult black tailed buck.

15. The rifle scope of claim 13, wherein one of said second indicia is the numeral "18" indicating the distance in inches from the bottom of the brisket to the top of the shoulders of an adult mule deer buck.

* * * * *